United States Patent [19]
Mickelson

[11] 3,867,788
[45] Feb. 25, 1975

[54] PLANT CARRIER

[76] Inventor: Richard C. Mickelson, 623 F. West Stoeker, Los Angeles, Calif. 91202

[22] Filed: May 29, 1973

[21] Appl. No.: 364,673

[52] U.S. Cl............................. 47/35, 248/318, 47/34
[51] Int. Cl............................................... A47g 7/00
[58] Field of Search................... 248/318, 302–303; 220/95; 47/35, 34; D35/3, 3 C; D6/113, 137

[56] References Cited
UNITED STATES PATENTS

| | | | |
|---|---|---|---|
| 1,077,423 | 11/1913 | Myers | 47/35 |
| 1,951,642 | 3/1934 | Augustin et al. | 47/34 |
| 2,859,557 | 11/1958 | Lattuca | 47/34 |

Primary Examiner—Robert E. Bagwill
Attorney, Agent, or Firm—Roger A. Marrs

[57] ABSTRACT

A carrier is disclosed herein for holding a plant and its soil that includes an open-ended enclosure having a bottom integrally formed at its peripheral edge with an upwardly projecting continuous sidewall diverging outwardly from the bottom and terminating in a reverse curl so to provide a rounded lip about the top of the sidewall. Pairs of holes are formed in the lip in spaced apart relationship for receiving wire hangers and the bottom is formed with area of reduced thickness for selective opening constituting drainage holes.

2 Claims, 5 Drawing Figures

PATENTED FEB 25 1975  3,867,788
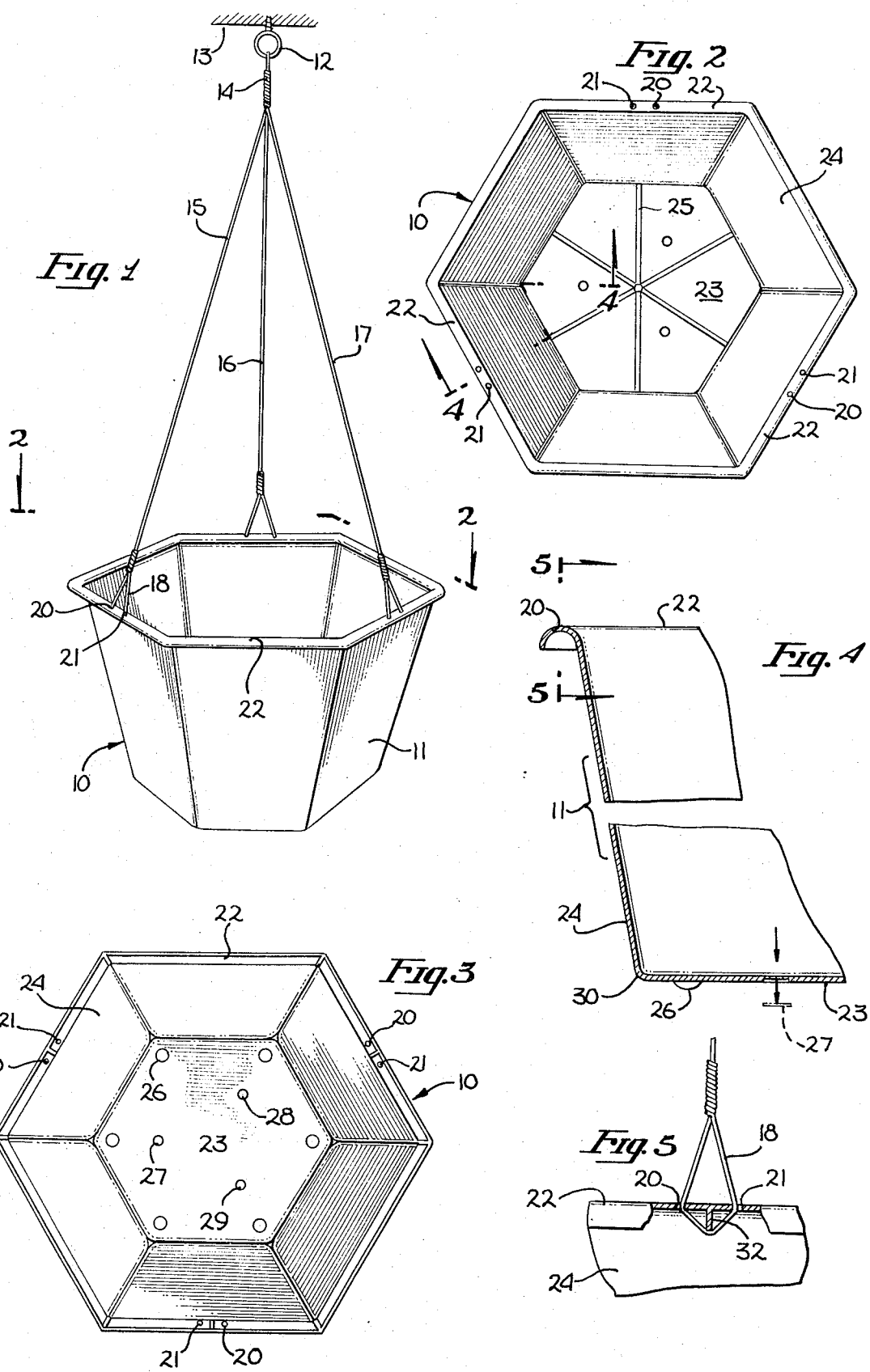

PLANT CARRIER

BACKGROUND OF THE INVENTION

1. Field of the Invention

This invention relates to the field of planters for holding a natural growing plant with its life environment in the form of soil and moisture and more particularly to a novel plant carrier of this type having reinforced portions for suspension from a hanging support and reduced thickness areas for providing drainage when desired.

2. Brief Description of the Prior Art

In the past, it has been the conventional practice to construct hanging or standing flower planters from wood or metal materials and shaped in such a fashion as to hold the plant and surrounding moist soil. Difficulties have been encountered with these conventional planters inasmuch as wood soon deteriorates when exposed to moisture due to cycling of drying and wetness over a period of time. Drying and wetness or dampness also deteriorates metal through corrosive actions and some metals tend to poison or retard the growth of the plant.

Recent attempts have been made to avoid the adverse effects of wood and metal by utilizing plastic materials. Although these attempts have been successful in prolonging the life of the planter and the plants contained therein, the thickness of plastic planters is generally substantial so as to hold the weight of the plant in the soil. Also, separate and individual metallic devices are used for fasteners such as wire hangers and the like so that the plastic carrier for the planted soil may be held in a suspended or hanging mode. Also, one type of planter is employed for a hanging or suspension mode while another type of prior carrier for the plant is utilized for standing on a surface support such as a bench, table or cement floor. A substantial difference in structure is encountered depending on the mode of usage for the planter inasmuch as bench or ground supported planters require drainage means while a suspended or hanging mode of planters employs evaporation process for drainage or moisture control.

Therefore, a long standing need is present for providing a carrier for plants and its life environment that may be universal in its mode of utilization such as either hanging or standing and that may be made from relatively thin plastic material having integral stiffeners and attachment means for support integrally formed therein.

SUMMARY OF THE INVENTION

Accordingly, the above difficulties and problems encountered with conventional planters, plant carriers and the like are obviated by the present invention which provides a carrier having a bottom supporting a continuous sidewall about its peripheral edge and wherein the continuous sidewall terminates in an upwardly and outwardly diverging curled lip. The lip is provided with an integral stiffener at selected locations about the peripheral edge of the lip and attachment means are provided at each of the integral stiffeners for supporting an attachment means when the planter is in its hanging mode of utilization. The bottom of the carrier includes areas of reduced thickness adapted to be punched out to form an opening or a plurality of openings therein constituting a drainage means when the carrier is used in its standing mode of utilization.

The sidewall of the carrier is integrally stiffened by forming the sidewall in a geometric shape such as a hexagon and the bottom is reinforced by means of integrally formed ribs radiating outwardly from the center thereof.

Therefore, it is among the primary objects of the present invention to provide a novel plant carrier that is fabricated from plastic material avoiding corrosion and deterioration generally associated with wood and metal products or materials and which includes integrally formed reinforcing means for rigidizing the structure.

Another object of the present invention is to provide a novel plant carrier having an upwardly and outwardly continuous sidewall from the bottom thereof that terminates in an inverse or reverse curled lip acting as a reinforcing means for rigidizing the sidewall.

Another object of the present invention is to provide a novel planter composed of plastic material having attachment means integrally formed therein for cooperating with hanging fasteners for supporting the carrier in a suspended or hanging mode of utilization.

Still another object of the present invention is to provide a novel carrier composed of plastic materials and including a bottom having portions of reduced thickness adapted to be punched out to provide a drain means when the carrier is employed in a standing mode of utilization.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a perspective view of the novel plant carrier of the present invention illustrated in a typical hanging mode of utilization;

FIG. 2 is a top plan view of the plant carrier shown in FIG. 1 as taken in the general direction of arrows 2—2 thereof;

FIG. 3 is a bottom plan view of the plant carrier shown in FIG. 2;

FIG. 4 is a transverse cross-sectional view of the sidewall and bottom of the plant carrier as taken in the general direction of arrows 4—4 of FIG. 2; and FIG. 5 is an enlarged fragmentary view, in cross-section, of an attachment means for suspending the plant carrier in its hanging mode of utilization.

DESCRIPTION OF THE PREFERRED EMBODIMENT

The novel plant carrier of the present invention is illustrated in the direction of arrow 10 in FIG. 1 which comprises an enclosure indicated in general by numeral 11 that is downwardly depending from a hook or eyelet 12 supported in a beam or ceiling 13. A wire hanging arrangement 14 is connected to the eyelet 12 and splits into branches 15, 16 and 17 to terminate in loops such as loop 18. Each loop passes through a pair of holes 20 and 21 carried in a curled lip 22 formed at the top of a continuous sidewall of the enclosure 11. In one form, the hanging arrangement includes wires 15, 16 and 17 which are twisted at one end to provide a common cable at numeral 14 while the opposite ends of which wire forming the respective loops are twisted about the major length of each respective wire to close and secure each of the respective loops.

As shown in FIG. 2, the enclosure 11 includes a bottom 23 having a peripheral edge which is integrally formed to provide a continuous sidewall indicated by numeral 24. The lip 22 is formed by reversing the terminating edge of the sidewall into a curl so that the curled lip 22 functions as an integral stiffener about the opening leading into the interior of the enclosure. It is also to be noted that the bottom 23 includes a plurality of integrally formed stiffeners collectively indicated by numeral 25 that radiate outwardly from the center of bottom 23 to its peripheral edge integrally formed with the sidewall 24. Attention is also directed to the attachment means which comprises a plurality of pairs of holes and in the present instance, three pairs of holes are provided through the lip 22. The pairs of holes are arranged in fixed spaced apart relationship so that when the respective wire loops are trained therethrough, the enclosure will be balanced when carrying a plant and the moisturized soil therefor.

In FIG. 3, it can be seen that the underside of bottom 23 includes a plurality of stand-offs such as is indicated by numeral 26 that are integrally formed with bottom 23 and serve to rest on a supporting surface such as a bench or floor. In this instance, the enclosure 11 is used in its standing mode of utilization and bottom 23 is further provided with areas or portions of reduced thickness indicated by numerals 27, 28 and 29 that are adapted to be removed so as to provide an opening. The areas of reduced material may be readily punched out or openings poked through the material so that water collecting on the bottom of the enclosure may readily drain therethrough so as to provide proper moisture control for the soil in the planter. It is to be noted that the respective areas of reduced thickness 27, 28 and 29 shown in FIG. 2 are also visibly indicated in bottom 23 from the other side of the bottom as shown in FIG. 2. It is important that these areas of reduced thickness be provided between adjacent stiffening ribs 25 and that the areas or portions of reduced thickness not occur at a location of a stiffening rib.

Referring now in detail to FIG. 4, an enlarged view of the planter is illustrated wherein it can be seen that bottom 23 integrally forms at its peripheral edge, as indicated by numeral 30 with continuous sidewall 24 that upwardly and outwardly projects in diverging fashion and which terminates in the reverse curl comprising lip 22. Hole 20 is visable as being one hole of the pair co-operating to comprise the attachment means for the wire system when the planter is in its hanging mode of utilization. Furthermore, it can be seen that the area of reduced thickness such as is indicated by numeral 27 may be readily punched out as shown in broken lines when it is desired to provide a draining means.

Referring now in detail to FIG. 5, the attachment means for a loop and in this instance, loop 18, is illustrated wherein the curled lip 22 further includes a stiffening support 32 integrally formed in the sidewall and extending between the opposite sides of the reverse reverse curl. A stiffening partition or rib 32 is strategically located between the pair of holes 20 and 21 so that loop 18 not only passes through the holes respectively, but passes around the underside of the stiffening rib 32. Thereby, sufficient structure is provided for supporting each of the respective loops in their fixed spaced apart relationship about the lip of the enclosure.

Although the sidewall 24 is illustrated in the geometric form of a hexagon, it can be appreciated that other geometric forms may be employed. However, it is a concept of the present invention to employ a form other than circular so that the sidewall is rigidized and stiffened by the nature of the shape.

Therefore, it can be seen that the novel planter of the present invention provides a carrier for a natural plant including its moisturized soil whereby the carrier may be employed in a hanging mode of utilization or in a standing mode. The composition of the enclosure is plastic and includes a variety of reinforcing and stiffening means so that the enclosure is rigidized. Draining means may be readily provided by punching out the respective areas of reduced thickness so that the carrier may be employed in a standing mode of utilization.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A plant carrier for holding a growing plant and its supporting soil comprising:

an enclosure having a flat bottom and an integral sidewall projecting upward and outward from the peripheral edge of said bottom;

said sidewall terminating at its free end in a reverse curled lip having a rounded peripheral edge defining a central opening leading into the interior of said enclosure;

said sidewall further having a predetermined geometric shape in horizontal cross section;

reinforcement means integrally formed in said bottom so as to radiate outwardly to said sidewall for rigidizing said enclosure;

attachment means for said enclosure comprising at least three pairs of openings arranged in fixed spaced apart relationship about said lip and a hanging wire system comprising at least three wires having loops trained through said holes for hanging said enclosure in a hanging mode of utilization;

said attachment means is disposed within the inner curve of said reverse curled lip comprising a stiffening rib extending transversely across said lip and further being disposed between each pair of said attachment means openings;

a plurality of stand-offs integrally formed in said bottom for supporting said enclosure in a standing mode of utilization;

a drainage means for said enclosure comprising a plurality of bottom portions of reduced thickness adapted to be severed from said bottom to leave a plurality of drainage holes therein.

2. The invention as defined in claim 1 wherein:

said enclosure is composed of plastic material whereby said portions of reduced thickness may be readily severed from surrounding plastic material.

* * * * *